(12) United States Patent
Schmidt

(10) Patent No.: US 6,614,958 B1
(45) Date of Patent: Sep. 2, 2003

(54) OPTICAL IMAGING SYSTEM

(75) Inventor: Siegmar Schmidt, Campbell, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/009,461

(22) PCT Filed: Oct. 8, 1999

(86) PCT No.: PCT/EP99/07553

§ 371 (c)(1),
(2), (4) Date: Apr. 2, 2002

(87) PCT Pub. No.: WO01/27681

PCT Pub. Date: Apr. 19, 2001

(51) Int. Cl.[7] .............................. G02B 26/02; G02B 6/35
(52) U.S. Cl. .......................... 385/33; 385/140; 385/18; 385/16
(58) Field of Search .................. 385/16, 19, 31, 385/33–35, 27, 39, 18

(56) References Cited

U.S. PATENT DOCUMENTS

| 5,321,774 | A |   | 6/1994 | Barnard et al. ............... 385/16 |
| 5,745,271 | A |   | 4/1998 | Ford et al. .................... 359/130 |
| 5,900,983 | A |   | 5/1999 | Ford et al. .................... 359/627 |
| 5,915,063 | A |   | 6/1999 | Colbourne et al. .......... 385/140 |
| 5,953,477 | A |   | 9/1999 | Wach et al. ................... 385/115 |
| 6,031,946 | A | * | 2/2000 | Bergmann et al. ............ 385/18 |
| 6,137,941 | A | * | 10/2000 | Robinson ..................... 385/140 |
| 6,181,846 | B1 | * | 1/2001 | Pan .............................. 385/18 |

FOREIGN PATENT DOCUMENTS

| EP | 0 557 542 B1 |   | 9/1995 |   |
| JP | 10307264 A |   | 11/1998 |   |
| JP | 2000131626 A | * | 5/2000 | ........... G02B/26/02 |

OTHER PUBLICATIONS

"Micromechanical Fiber–Optic Attenuator with 3 microsecond Response", Ford et al, Journal of Lightwave Technology, vol. 16, No. 9, Sep. 1998, pp. 1663–1670.*

Theopistou, P., Authorized Officer. International Search Report, Application No. PCT/EP 99/07553, dated Apr. 27, 2000.

* cited by examiner

Primary Examiner—Hemang Sanghavi
Assistant Examiner—Scott Knauss

(57) ABSTRACT

An optical system for imaging an input beam from an input to an output beam at an output. The system includes a lens adapted for receiving the input beam from the input, and a reflecting device adapted for reflecting the input beam from the lens back to the lens. The lens is adapted for converging the beam reflected by the reflecting device to the output. The input and the output are both located substantially in the focal plane of the lens and off axis, with respect to the optical axis of the lens, on opposing sides from the optical axis of the lens. The reflecting device is located on a side opposite, with respect to the principal plane of the lens, to the side of the input and the output.

12 Claims, 3 Drawing Sheets

OPTICAL IMAGING SYSTEM

BACKGROUND OF THE INVENTION

The present invention relates to an optical imaging system for optically mapping an object at an input to an object at an output.

Optical imaging systems are widely known in the art and can be applied for mapping an input image to an output image substantially with or without modifying the characteristics of the input image. A typical application wherein the characteristics of the input image is intended to be modified by the optical imaging system is in optical attenuator.

Optical attenuators are known e.g. from DE-A-3613688 or GB-A-2074339or EP-A-557542 discloses an optical attenuator as shown in FIG. 1. The attenuator is inserted between two optical fibers 1 and 2. A cone of light 3 leaving the fiber 1 is converted by a lens 4 to a beam of parallel light 5, which impinges on an attenuator disc 6. The attenuator disc 6 comprises two parts 25 and 28 glued together such that they form a disc having rectangular cross section. After transmission through the disc 6, the attenuated light beam 7 impinges on a corner cube 8 reflecting the incident light into the same direction where it came from, but with a parallel offset. Thus, the beam reflected from the corner cube 8 is again transmitted through the disc 6, but at a slide different position than at the first transmission.

The purpose of transmitting the beam twice through the attenuator disc 6 is to compensate beam deviations caused by refractive index differences and oblique light incidence. After the second transmission through the disc 6, the beam 9 impinges on a prism 10 which reflects the beam twice by 90 degrees such that the outgoing beam 11 has a parallel offset relative to the beam 9 leaving the attenuator disc 6. The outgoing beam 11 is then focused by a lens 12 into the fiber 2. The disc 6 is rotatable around an axis 13 by means of a motor 14 in response to control signals from a control circuitry 20. The adjustment of different attenuation factors is achieved by adjusting different angular orientations of the disc 6.

The attenuator disc 6 comprises one part 28 which is made of a light absorbing material and one part 25 which is substantially transparent for the light impinging on it. Those parts are wedge-shaped and fixed together such that the resulting disc 6 has a rectangular cross section. The thickness of the wedges, in combination, remains constant in a direction perpendicular to the plane of the paper in FIG. 1. The beams 5 and 9 impinging on the light-absorbing wedge from the left or from the right (after reflection by the corner cube 8) traverse the same distance within the light-absorbing wedge. Since the thickness of the absorbing part of the disc 6 which the beam 5 passes depends on the angular orientation of disc 6, the attenuation of the beam 5 can be continuously varied by rotating the disc 6 around the axis 13. The motor 14 might be furnished with a position encoder indicating the angular position of the attenuator disc 6.

SUMMARY OF THE INVENTION

It is an object of the present invention to provide an improved optical attenuator in particular with respect to costs. The object is solved by the independent claims. Preferred embodiments are shown by the dependent claims.

The invention provides an improved optical imaging or mapping system for mapping an object at an input source to an object at an output. The optical mapping system of the present invention comprises a source adapted for emitting a diverging optical beam to a lens, a reflecting device (such as a mirror) adapted for reflecting a parallel beam from the lens back to the lens, and an output adapted for receiving a converging beam from the lens. The source and the output are both located substantially in the focal plane of the lens and off axis, with respect to the optical axis of the lens, on opposing sides from the optical axis of the lens. The reflecting device is located on opposite side of the source and the output with respect to the principal plane of the lens and arranged so that a beam from the source will be mapped to the output.

Because of the off axis location of the source and the beam with highest intensity from the source not being directed through the center of the lens, the lens collimates the diverging light beam from the source to a parallel beam skew with respect to the optical axis. The reflecting device reflects this skew but parallel beam back to the lens. In this reverse direction, the optical radiation is focused to the output. The position (i.e. distance away from the lens and angle with the principal plane of the lens) of the reflecting device is preferably chosen for achieving a low insertion loss for coupling optical radiation from the source to the output.

It will be appreciated that while the optical mapping system of FIG. 1 comprises two lenses (4 and 12), the optical mapping system of the present invention is designed to require only one lens, and the optical beam travels twice through the lens system. Thus, the optical mapping system of the present invention requires less components and adjustment effort than the optical mapping system applied for the attenuator of FIG. 1, and is therefore less expensive and easier to produce and adjust.

In a preferred embodiment, the plane of the reflecting device is substantially parallel with the principal plane of the lens. However, it is to be understood that tilting (i.e. providing an angle between the plane of the reflecting device and the principal plane of the lens) the reflecting device can be used/required for compensating a difference in off axis location between the source and the output, and vice versa.

In another embodiment, the plane of the reflecting device substantially crosses the optical axis of the lens at the cross point of the optical axis of the lens with beam of highest intensity from the source after passing the lens. Thus, a low insertion loss can be achieved.

Another degree of freedom for the design of the mapping system is the angle of radiation (preferably of the beam with highest intensity) from the source. Increasing the angle provided with the optical axis of the lens requires that the reflecting device has to be positioned farther away from the lens. Thus, the longitudinal dimension of the system can be adjusted as might be required e.g. for inserting components in the beam.

It is to be understood that the optically simplest arrangement for a mapping according to the invention is in case that:

the source and the output are both located off axis in the focal plane of the lens, whereby the beam with highest intensity from the source is directed to the lens but not through the center of the lens;

the plane of the reflecting device is substantially parallel with the principal plane of the lens and might only be slightly tilted in order to compensate a (slight) deviation in the distances of the source and the output from the optical axis of the lens; and the plane of the reflecting device substantially crosses the optical axis of the lens at the cross point of the optical axis of the lens with beam of highest intensity from the source after passing the lens.

It is clear, however, that deviations from this 'easiest' design can increase the optical complexity of the system, but might be desired for specific applications.

In a preferred embodiment, fiber ends respectively represent the source and the output. The input and output fiber ends, emitting light towards the optical attenuator or receiving light therefrom, are preferably both located in the focal plane of the lens. The position of the input fiber end and the output fiber end are both off axis, each preferably situated with the same distance away (offset) from the axis. The input and output fibers are preferably located very tight together and preferably glued in a holding device. By providing the fiber ends angled, the angle of radiation of the center beam (with highest intensity) and thus the distance between the lens and the reflecting device can be adjusted.

Within the optical mapping system of the present invention, different components (such as any kind of attenuating filter as known in the art such as the attenuating filters as disclosed in EP-A-557542) can be applied for modifying the characteristics of the output beam with respect to the characteristics of the input beam of the system. The component(s) is/are preferably inserted between the lens and the reflecting device, whereby the component(s) can be arranged so that the beam travels once or twice through the component(s), or, in other words, that either only the parallel beam to or from the reflecting device, or both pass the respective component(s).

The input and output fiber ends can be straight or angled, and might be provided e.g. by using polishing or cleaving techniques. Angled fiber ends can be applied for achieving low back reflections (high return loss), as disclosed e.g. in the co-pending European Patent Application 99109469.9 by the same applicant. The teaching of that document with respect to the provision of termination surfaces will be incorporated herein by reference.

Between the lens and the reflecting device, an optional polarization rotator (as disclosed e.g. by Donald K. Wilson in "Optical isolators cut feedback in visible and near-IR lasers", Laser Focus/Electro-Optics, Dec. 1988, pp. 103 ff.) might be located to reduce the polarization dependent attenuation e.g. resulting from an inserted component such as a filter. Preferably, the polarization rotator is an optical Faraday rotator with 45 degrees polarization rotation. In this case, the optical radiation forward beam and reverse beam go through the Faraday rotator and the total polarization rotation is 2×45°=90°. Because of the resulting polarization dependent loss PDL=0, the optical polarization axis of any elliptical (or linear) state of polarization of the reverse beam is rotated 90 degrees with respect to the optical polarization axis of any elliptical (or linear) state of polarization of the forward beam. Due to the passing twice through the optical filter with a polarization rotation of 90 degree between the forward and the reverse beam, the polarization dependent loss of the optical filter is averaged out. The result is a polarization independent attenuation of the complete optical system according to the invention.

The reflecting device is preferably designed to provide a maximum of reflectivity and a low insertion loss. For wavelengths in the near infrared spectrum, e.g. about 1550 nm, the reflecting device is preferably provided as a gold-coated mirror. Accordingly, for other wavelengths, a mirror with maximum reflectance will have to be chosen.

The optical system according to the invention can thus be designed to provide no or only reduced polarization dependent attenuation, in particular with respect to the embodiment of FIG. 1. Furthermore the inventive optical system is less costly than e.g. the system of FIG. 1, since less material is required (e.g. only one lens instead of two). Additionally, the adjustment effort can be significantly reduced when e.g. the input and output fibers are adjusted together. Moreover, due to the double-pass design a compact size of the complete optical system can be achieved.

BRIEF DESCRIPTION OF THE DRAWINGS

Other objects and many of the attendant advantages of the present invention will be readily appreciated and become better understood by reference to the following detailed description when considering in connection with the accompanied drawings. Features that are substantially or functionally equal or similar will be referred to with the same reference sign(s).

DETAILED DESCRIPTION OF THE INVENTION

Figure 1:
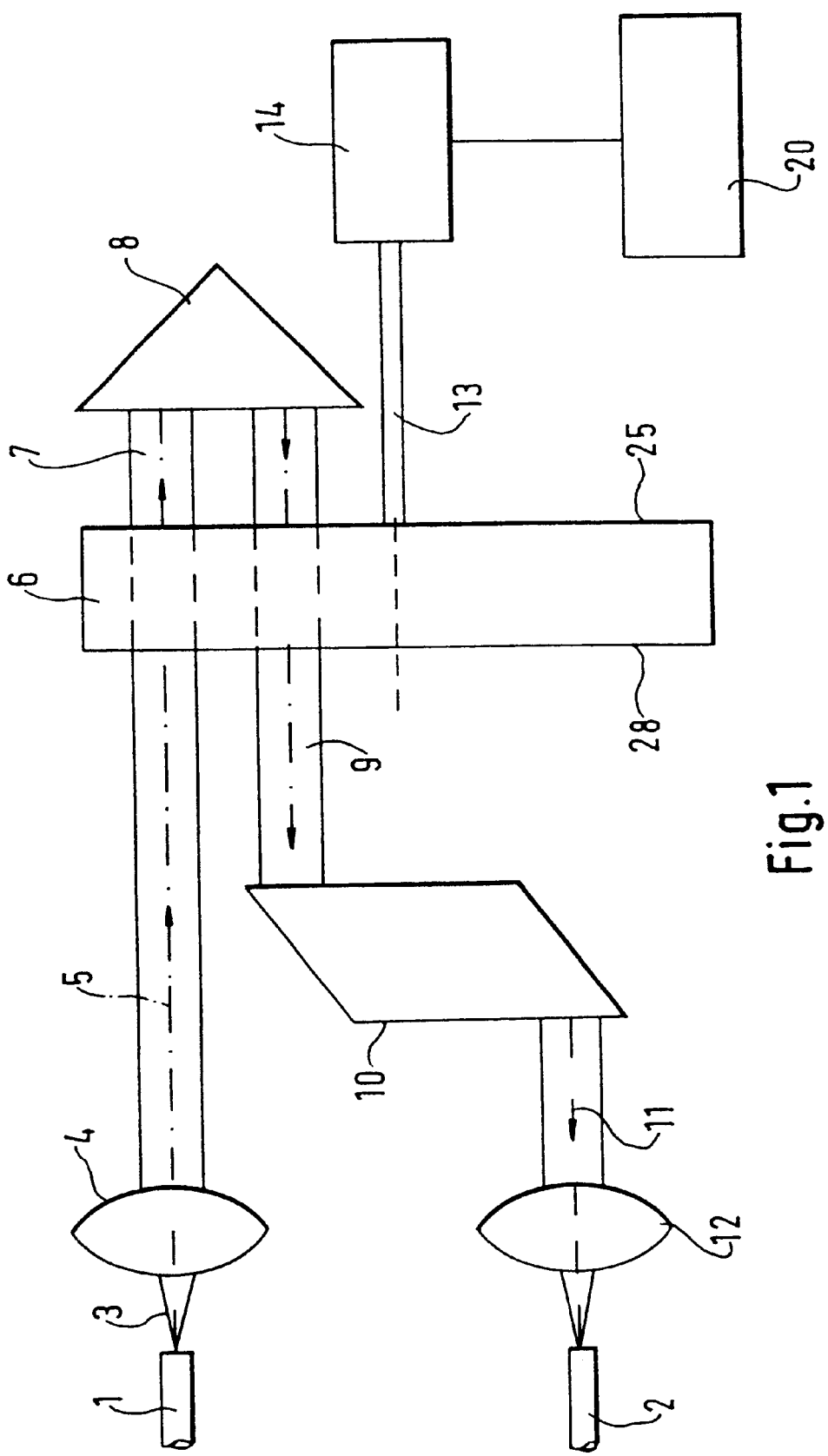
FIG. 1 shows an optical attenuator as known in the art.
Figure 2:
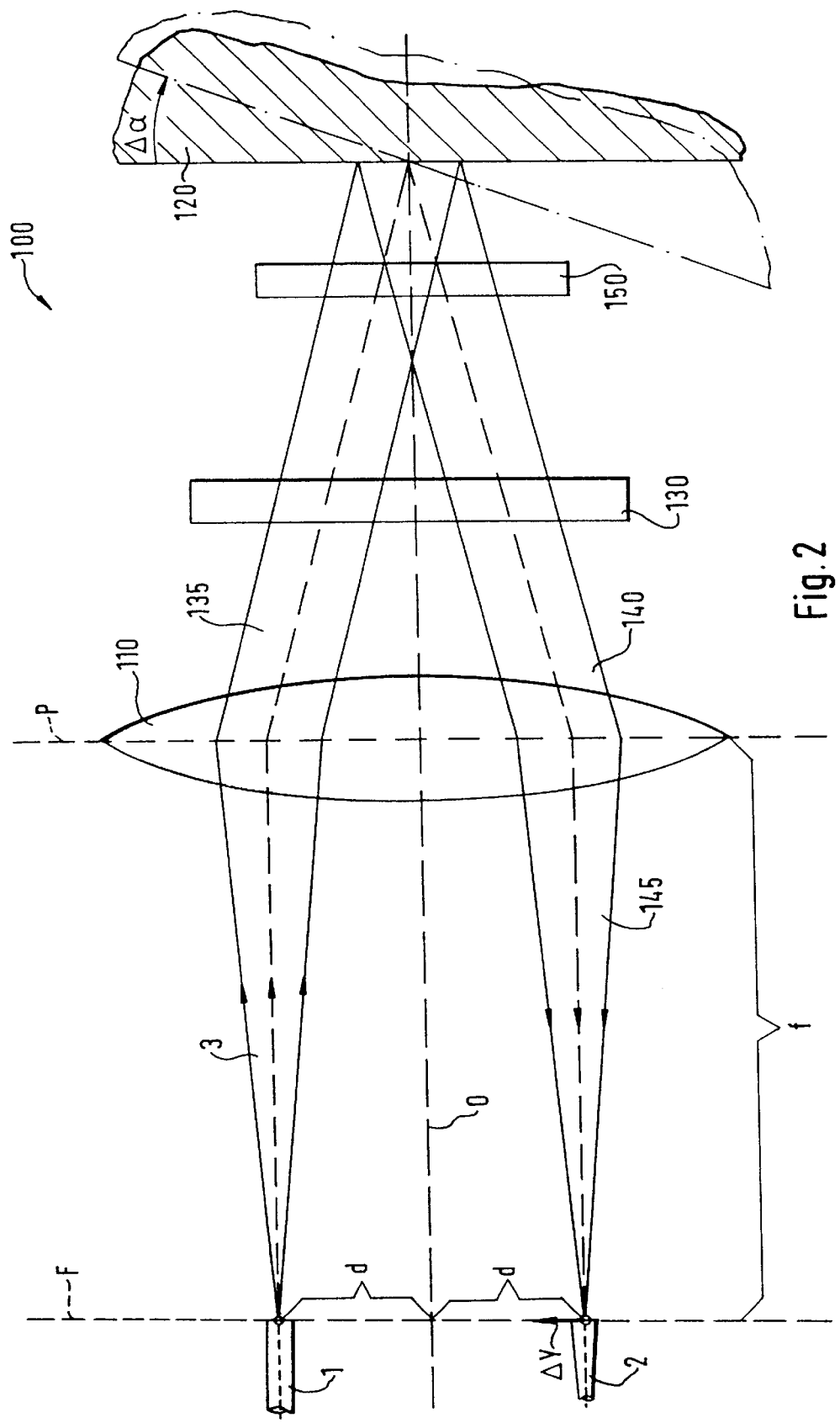
FIGS. 2 and 3 show embodiments of an optical attenuator 100 according to the invention.

FIG. 2 shows a first embodiment of an optical attenuator 100 according to the invention comprising a lens 110, an optical mirror 120 and an optical attenuating filter 130 in-between. P denotes the principle plane, F the focal plane, and O the optical axis of the lens 110. The input fiber 1 and the output fiber 2 are both located off axis, preferably with the same distance (offset) d away from the optical axis O. Furthermore, the ends of the input fiber 1 and the output fiber 2 are preferably both located substantially in the focal plane F.

In case that the ends of the input fiber 1 and the output fiber 2 are not off axis with the same distance from the axis, the mirror 120 has to be tilted by an angle $\Delta\alpha$ (as indicated in FIG. 2) with respect to the principal plane P. The fiber end 2 will be displaced by an amount $\Delta y$ dependent on the angle $\Delta\alpha$ and the focal length f:

$$\Delta y \approx f \cdot \tan(2 \cdot \Delta\alpha).$$

The cone of light 3 leaving the fiber 1 is collimated by the lens 110 to a parallel forward beam 135. Due to the off axis location of the input fiber 1, the forward beam 135 is skew with respect to the optical axis O. The forward beam 135 is reflected at the optical mirror 120, which is provided substantially parallel to the principle plane P of the lens 110, into a reverse beam 140 traveling back towards the lens 110. The optical lens 110 focuses the reverse beam 140 back as a converging beam 145 into the output fiber 2.

It is clear that only if the ends of the input fiber 1 and the output fiber 2 are located in the focal plane F, the forward beam 135 will be fully parallel. Although a certain non-parallelism of the forward beam 135 will be acceptable for most applications, the deviation from the focal plane F should preferably be smaller than approximately 5% (preferably about 2%) of the focal length f. Otherwise, the optical arrangement will become increasingly complicated.

Since the optical attenuating filter 130 is situated between the lens 110 and the optical mirror 120, as well the forward beam 135 as the reverse beam 140 will pass therethrough, so that both beams 135 and 140 can be attenuated. The attenuating filter 130 can comprise any attenuating means as known in the art such as the attenuating disc 6 as described in detail in the above cited EP-A-557542. The optical attenuating filter 130 can be provided rotatable, preferably around the optical axis O, or fixed. Instead of changing the degree of attenuation by rotating an attenuating filter as disclosed in EP-A-557542, a longitudinal attenuating filter can be applied, whereby the degree of attenuating is varied by moving the optical attenuating filter 130 parallel to the principle plane P of the lens 110. Attenuating filters with attenuation coating on a substrate (e.g. metallic coating) can be applied accordingly.

Between the optical attenuating filter 130 and the optical mirror 120, an optional polarization rotator 150 might be provided for reducing the polarization dependent attenuation of the optical attenuator 100. Preferably, the polarization rotator 150 is an optical Faraday rotator (as disclosed e.g. in EP-A-352002) with 45° polarization rotation, so that the total polarization rotation is 2×45°=90°.

Figure 3:
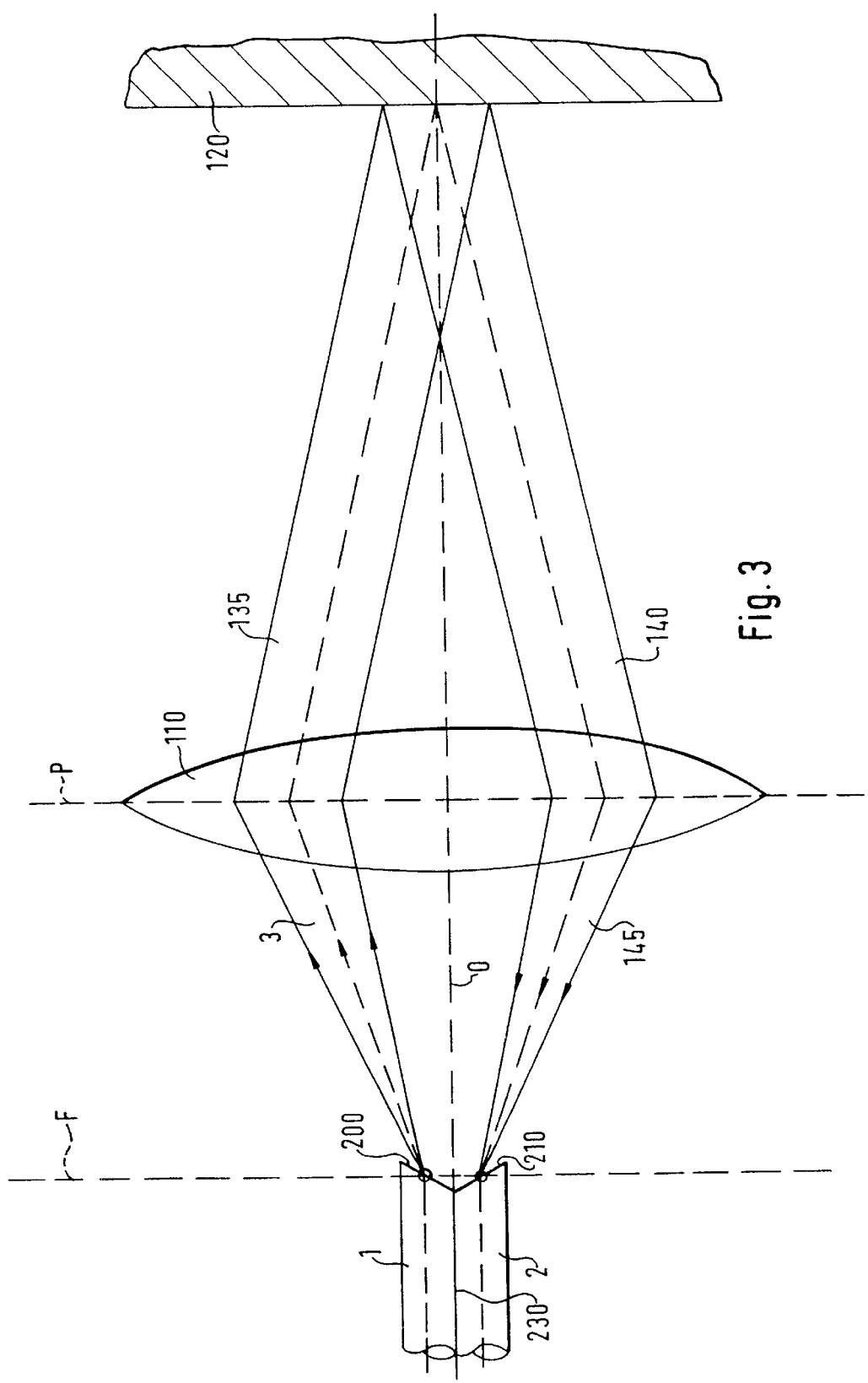

FIG. 3 shows a second embodiment of an optical attenuator 100 according to the invention, which substantially corresponds to the embodiment of FIG. 2. The input fiber 1 and the output fiber 2, however, are provided with angled fiber ends 200 and 210. The angle of the fiber ends determines the angle of radiation of the center beam (as normally the beam with highest intensity—indicated in FIGS. 2 and 3 by a dotted center line in the light paths) and thus the distance between the lens 110 and the mirror 120. Increasing the angle of radiation will also increase the distance between the lens 110 and the mirror 120, thus allowing to achieve more space for inserting components between the lens 110 and the mirror 120. It is clear that the angle of the fiber end 210 has to be opposite to the angle of the fiber end 200, as depicted in FIG. 3.

In a preferred embodiment, the input fiber 1 and the output fiber 2 are directly coupled together, whereby a surface 230 at which the input fiber 1 and the output fiber 2 are mated together is located substantially within the optical axis O.

The fiber ends 200 and 210 are preferably angled towards each other as can be seen from FIG. 3. Preferably, the fiber ends 200 and 210 are each angled with respect to the optical axis O in a range smaller than approximately 10°, and preferably about 8°.

What is claimed is:

1. An optical system for imaging an input beam from an input to an output beam at an output, comprising:
    a lens adapted for receiving the input beam from the input, and
    a reflecting device adapted for reflecting the input beam from the lens back to the lens,
    whereby:
        the lens is adapted for converging the beam reflected by the reflecting device to the output,
        the input and the output are both located substantially in a focal plane of the lens and off axis, with respect to an optical axis of the lens, on opposing sides from the optical axis of the lens,
        the reflecting device is located on a side opposite, with respect to a principal plane of the lens, to the side of the input and the output, and
        wherein an angle of radiation from the input provided with respect to the optical axis of the lens is adjusted for adjusting the distance between the reflecting device and the lens.

2. The optical imaging system of claim 1, wherein the reflecting device is a substantially plane mirror for reflecting a substantially parallel beam from the lens back to the lens.

3. The optical imaging system of claim 1, wherein a reflecting plane of the reflecting device is substantially parallel with the principal plane of the lens.

4. The optical imaging system according to claim 1, wherein a plane of the reflecting device substantially crosses the optical axis of the lens at a cross point of the optical axis of the lens with a beam of highest intensity from the input after passing the lens.

5. The optical imaging system according to claim 1, wherein:
    the input and the output are both located off axis in the focal plane of the lens, whereby the beam with highest intensity from the input is directed to the lens but not through the center of the lens;
    the plane of the reflecting device is substantially parallel with the principal plane of the lens or slightly tilted in order to compensate a deviation in the distances of the input and the output from the optical axis of the lens; and
    the plane of the reflecting device substantially crosses the optical axis of the lens at the cross point of the optical axis of the lens with beam of highest intensity from the input after passing the lens.

6. The optical imaging system according to claim 1, wherein:
    the input includes a first fiber end and the output includes a second fiber end, wherein the first and second fiber ends are located together in a holding device.

7. The optical imaging system according to claim 6, wherein the fiber ends are angled for adjusting a distance between the lens and the reflecting device by means of the angle of radiation.

8. The optical imaging system according to claim 1, wherein:
    a polarization rotator is arranged between the lens and the reflecting device, so that an optical beam from the input to the output travels at least once through the polarization rotator, for reducing polarization dependent attenuation.

9. An optical modification system for modifying the characteristics of an optical beam, comprising:
    an optical imaging system for imaging an input beam from an input to an output beam at an output, including:
        a lens adapted for receiving the input beam from the input, and
        a reflecting device adapted for reflecting the input beam from the lens back to the lens, whereby the lens is adapted for converging the beam reflected by the reflecting device to the output, the input and the output are both located substantially in a focal plane of the lens and off axis, with respect to an optical axis of the lens, on opposing sides from the optical axis of the lens, the reflecting device is located on a side opposite, with respect to a principal plane of the lens, to the side of the input and the output, and wherein an angle of radiation from the input provided with respect to the optical axis of the lens is adjusted for adjusting the distance between the reflecting device and the lens;
    wherein the optical beam of the optical modification system is applicable at the input thereof, the optical modification system further comprising:
    a filter arranged between the lens and the reflecting device of the optical imaging system, so that the optical beam travels at least once through the filter.

10. The optical imaging system of claim 1, wherein an angle is provided between the plane of the reflecting device and the principal plane of the lens for compensating a difference in off axis location between the input and the output.

11. The optical imaging system according to claim 8, wherein the polarization rotator is an optical Faraday rotator with 45 degrees polarization rotation.

12. The optical modification system of claim 9, wherein the filter is an attenuator.

* * * * *